(12) United States Patent
Marioni

(10) Patent No.: US 9,914,501 B2
(45) Date of Patent: Mar. 13, 2018

(54) BATTERY HOLDER DEVICE FOR ELECTRIC BICYCLE

(71) Applicant: ASKOLL EVA S.R.L., Povolaro di Dueville (Vicenza) (IT)

(72) Inventor: Elio Marioni, Dueville (IT)

(73) Assignee: Askoll Eva S.r.l., Povolaro di Dueville (VI) (IT)

(*) Notice: Subject to any disclaimer, the term of this patent is extended or adjusted under 35 U.S.C. 154(b) by 188 days.

(21) Appl. No.: 14/658,602

(22) Filed: Mar. 16, 2015

(65) Prior Publication Data
US 2015/0266543 A1    Sep. 24, 2015

(30) Foreign Application Priority Data

Mar. 18, 2014  (IT) .............................. MI2014A0451

(51) Int. Cl.
*B62M 6/90*     (2010.01)
*B60L 3/12*     (2006.01)
(Continued)

(52) U.S. Cl.
CPC ................. *B62M 6/90* (2013.01); *B60L 3/12* (2013.01); *B60L 11/007* (2013.01); *B60L 11/1803* (2013.01); *B60L 11/1864* (2013.01); *B60L 11/1877* (2013.01); *B60L 11/1879* (2013.01); *B60L 2200/12* (2013.01); *B60L 2210/40* (2013.01); *B60L 2220/44* (2013.01);
(Continued)

(58) Field of Classification Search
CPC ... B60L 11/1877; B60L 11/1879; B62M 6/90; B62K 19/40; H01M 2/10
See application file for complete search history.

(56) References Cited

U.S. PATENT DOCUMENTS 6,423,443 B1 *  7/2002  Tsuboi .................... B60K 1/04
                                                       180/68.5
9,159,974 B2 *  10/2015  Kwag ...................... B62M 6/90
(Continued)

FOREIGN PATENT DOCUMENTS

EP       1 092 621 A2      4/2001
JP       1997-226653   *   9/1997  .............. B62J 11/00
(Continued)

OTHER PUBLICATIONS

Italian Search Report issued in connection with MI2014A000451.

*Primary Examiner* — Kevin Hurley
(74) *Attorney, Agent, or Firm* — Akerman LLP

(57) ABSTRACT

The invention relates to a battery holder device (1) for an electric bicycle (2), for example of the type with pedal assist by means of an electric motor. Such a battery holder device is designed to be housed inside a corresponding housing seat associated with the frame of the bicycle and to be connected to the electric motor of said bicycle. For this purpose, the battery holder device has a box-like body (20) having the structure of a removable rigid bag provided with a concealable-type handle (27); housing inside the corresponding seat is performed by means of snap-engagement of mechanical means and counter-means which comprise the said handle (27); an electrical connection with the motor (3) is established by means of coupling together of electrical connectors (17) provided in the box-like body (20) and in the housing seat.

10 Claims, 13 Drawing Sheets

(51) Int. Cl.
  *B60L 11/00* (2006.01)
  *B60L 11/18* (2006.01)
(52) U.S. Cl.
  CPC ... *B60L 2240/547* (2013.01); *B60L 2240/549* (2013.01); *Y02T 10/7005* (2013.01); *Y02T 10/7061* (2013.01); *Y02T 10/7241* (2013.01)

(56) References Cited

U.S. PATENT DOCUMENTS

| | | | |
|---|---|---|---|
| 2010/0136425 A1 | 6/2010 | Gau et al. | |
| 2010/0275564 A1 | 11/2010 | Baetica et al. | |
| 2011/0272203 A1* | 11/2011 | Sugimoto | B60K 1/04 180/206.1 |
| 2011/0304200 A1* | 12/2011 | Saida | B62M 25/08 307/9.1 |
| 2012/0053804 A1* | 3/2012 | Saida | B60L 7/10 701/70 |
| 2012/0082881 A1* | 4/2012 | Tsukamoto | H01M 10/425 429/120 |
| 2012/0216347 A1* | 8/2012 | Tundo | A47C 3/02 5/109 |
| 2012/0316710 A1* | 12/2012 | Saida | B62M 6/45 701/22 |
| 2012/0322321 A1* | 12/2012 | Kwag | H01R 33/765 439/754 |
| 2013/0004818 A1* | 1/2013 | Honda | B62M 6/90 429/98 |
| 2013/0118825 A1* | 5/2013 | Kwag | B62M 6/90 180/220 |
| 2013/0206491 A1* | 8/2013 | Kor | B60K 1/04 180/65.225 |
| 2013/0233631 A1* | 9/2013 | Jauvtis | B62M 6/55 180/206.4 |
| 2014/0017542 A1* | 1/2014 | Suzuki | B62M 6/90 429/99 |
| 2014/0227411 A1* | 8/2014 | Popeil | A47J 37/1209 426/302 |
| 2014/0319907 A1* | 10/2014 | Yamazaki | B60K 1/04 307/9.1 |
| 2015/0210351 A1* | 7/2015 | Tagaya | B62M 6/90 280/288.4 |
| 2015/0222131 A1* | 8/2015 | Kano | H02J 7/0013 320/112 |
| 2016/0046341 A1* | 2/2016 | Briney | B62J 11/00 224/414 |
| 2016/0056432 A1* | 2/2016 | Searles | B60L 11/1859 701/22 |
| 2016/0254506 A1* | 9/2016 | Nishihara | H01M 2/1083 180/68.5 |
| 2016/0339984 A1* | 11/2016 | Li | B62K 23/02 |

FOREIGN PATENT DOCUMENTS

| | | |
|---|---|---|
| JP | H09 226653 A | 9/1997 |
| JP | H11 105759 A | 4/1999 |

\* cited by examiner

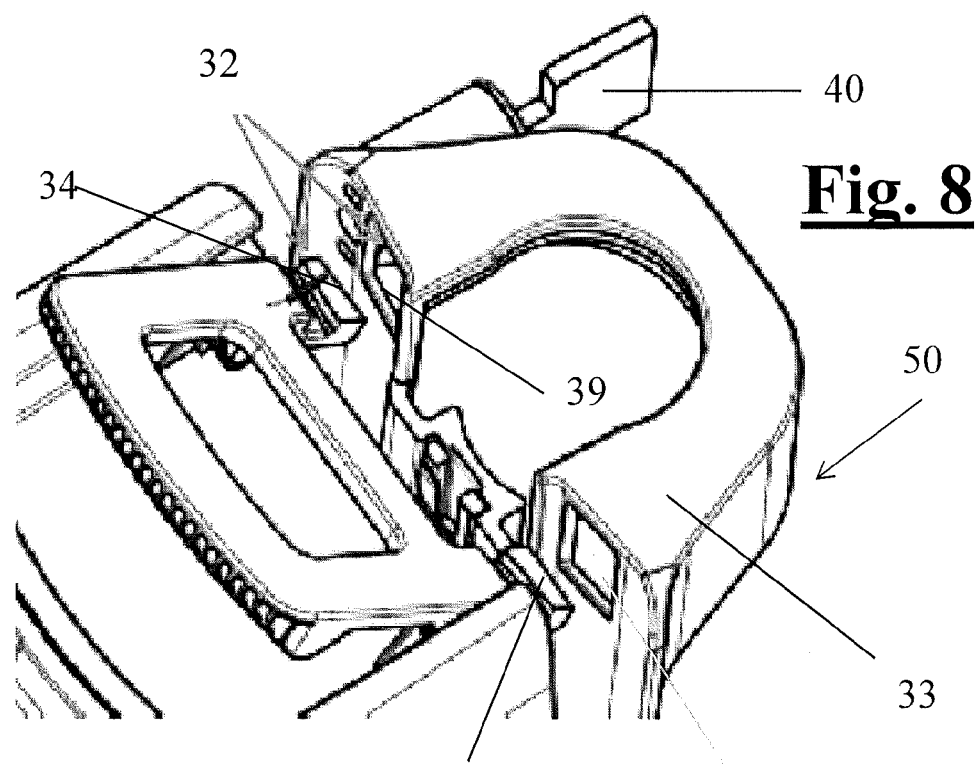
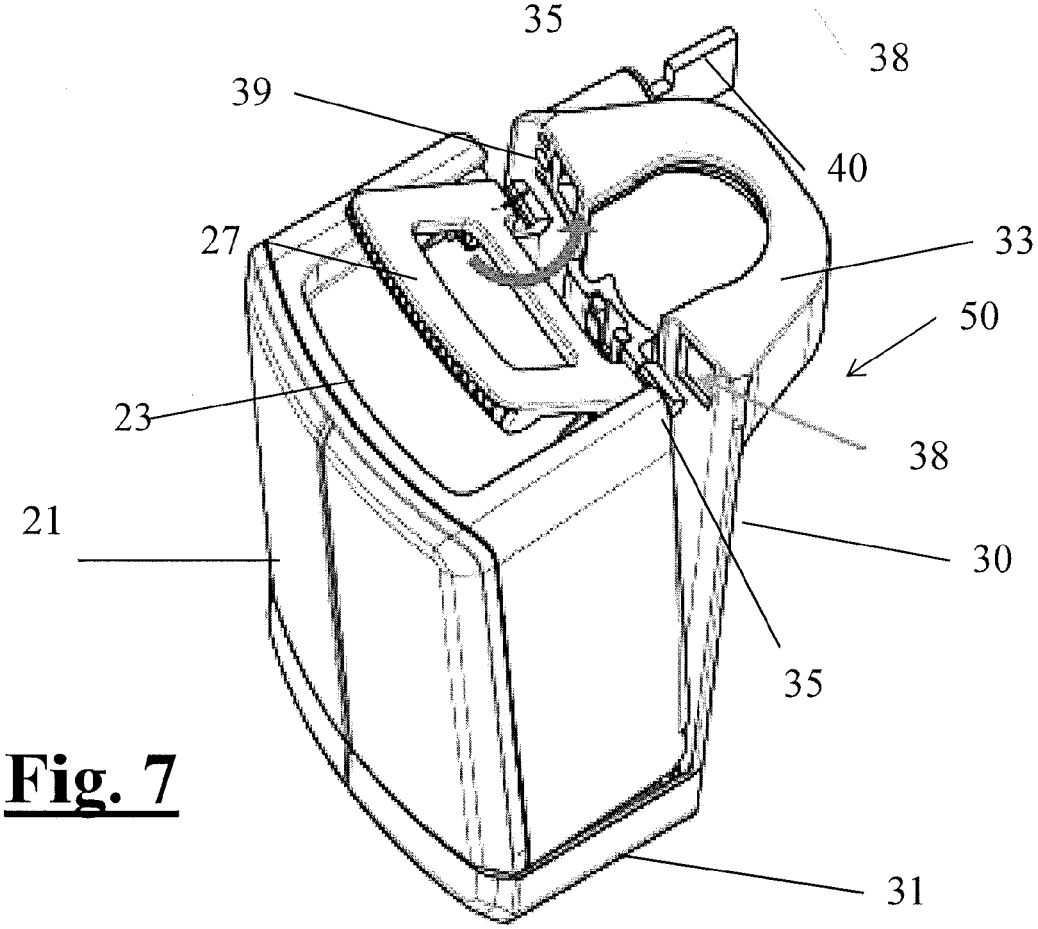

BATTERY HOLDER DEVICE FOR ELECTRIC BICYCLE

CROSS-REFERENCE TO RELATED APPLICATIONS

The present application claims priority to Italian Patent Application No. MI2014A000451, filed Mar. 18, 2014, the entirety of which is incorporated herein by reference.

FIELD OF APPLICATION

The present invention relates to a battery holder device for electric bicycles.

More particularly, but not exclusively, the invention relates to a device of the aforementioned type for electric bicycles of the type with pedal assist by means of an electric motor, the battery holder device being designed to be housed inside a corresponding seat associated with the bicycle frame and to be connected to the electric motor.

PRIOR ART

During the last few years, electric bicycles have become increasingly popular. They are greatly appreciated by end users because they are practical and easy-to-use and have also gained the approval and recognition of governments who are promoting their purchase by offering a number of financial incentives.

The heart of an electric bicycle consists of the electric motor, which is turn powered by rechargeable batteries. Generally, the batteries are housed inside a special compartment designed to protect them from external agents, such as water and dust, which could adversely affect correct operation thereof or reduce their working life and the recharging cycles.

The battery holder includes contact terminals which allow transmission of the energy from the batteries to the motor and is normally situated in a point of the bicycle frame such as to allow an easy interconnection with the electric motor. Generally, the battery holder is positioned against one of the frame tubes, for example in the space between the pedals and the saddle or also at the rear of the electric bicycle.

The battery holders are often shaped so as to have a shape matching that of a portion of the bicycle, for example the tube of the frame or the rear baggage rack.

More particularly, the battery holder is fixed to the frame of the bicycle (or onto a support bracket also fixed to the frame) by means of sutable mechanical fastening means provided with fixing means. The batteries may be removed if they need to be replaced, by loosening the fastening means.

However, in the known devices it often happens that the fixing elements are mainly U-bolts, clamps, screws or the like, or in any case elements which require the use of mechanical tools in order to release them. The disassembly operations are therefore not easy for the user and the operation of replacing the batteries in the electric bicycles which are currently commercially available is fairly complicated.

This results not only in long and difficult maintenance operations which require the assistance of an expert, but also reassembly operations which are equally long and difficult and consequently costly.

Once disassembled, the battery pack is also bulky, heavy and difficult to handle such that transportation thereof by a single person is generally awkward.

For the abovementioned reasons, removal of the batteries is performed only exceptionally in the case of maintenance or replacement and normally they are kept mounted on the bicycle.

Thus, when the batteries must be recharged it is necessary to take the bicycle to a location where there are power sockets connected to the electricity supply network.

Moreover, the battery pack, which has a relatively high economic value, may be prone to theft or vandalism if the electric bicycle is left unguarded in external locations which are accessible to the public.

On the basis of the above considerations an object of the present invention is to propose a battery holder device which is able to overcome the drawbacks mentioned with reference to the prior art.

More particularly, an object of the present invention is to provide a battery holder device with particularly small dimensions having structural and functional characteristics such as to allow recharging of the battery in a location separate from the location where the electric bicycle is kept.

SUMMARY OF THE INVENTION

The proposed solution forming the basis of the present invention is that of providing a removable and sealed battery holder which can be positioned at the front so as to favour the stability of the bicycle and is provided with a quick-action engaging and disengaging mechanism which allows it to be easily removed from the bicycle frame or from a support bracket designed to hold it.

On the basis of this proposed idea the invention achieves the predefined objects by means of battery holder device for an electric bicycle, designed to be associated with a frame and to be electrically connected to at least an electric motor of an electric bicycle, comprising: a support portion which can be rigidly associated with said frame; and a box-like body enclosing inside it at least one power supply battery and coupled to a housing seat of said support portion. The box-like body is removably coupled to said housing seat and provided with a handle movable between a rest position and an operative position, and coupling to said housing seat is performed by snap-engagement of mechanical coupling means and counter-means respectively born by said box-like body and by said support portion, said mechanical coupling means being integral with said handle so that the displacement of said handle from said rest position to said operative position causes disengagement of the mechanical coupling counter-means. The box-like body and the support portion are provided with respective electric connectors which define a reciprocal electrical connection when said box-like body is coupled to said housing seat.

It should be noted that the support portion defined above may be optionally integrated with the bicycle frame or may be formed as one piece with a tube thereof or may be joined to the frame by removable coupling means.

Advantageously, the handle is hinged on said box-like body about a hinging axis; said mechanical coupling means comprising at least a tooth formed on an extension arm of the handle extending beyond the hinging axis.

It should be noted that the teeth are preferably two in number and are mounted respectively on the two arms which define the extension beyond the hinging axis of the U-shaped body of the handle.

The mechanical coupling means may in particular comprise at least an opening (preferably two openings) formed on said housing seat, said at least one tooth integral with said handle engaging in said opening when the handle is in the rest position.

The handle may be constantly biased towards the rest position by elastic recall means, preferably consisting of a torsion spring inserted along the hinging axis.

By raising the handle upwards, the recall force of the spring will be overcome, thus releasing the box-like body from the support portion. It should be noted that in the disengaged condition of the box-like body, with the handle in the operative or vertical position, the weight itself of the box-like body opposes the force of the recall spring, keeping the handle in position.

The handle, in its rest position, may advantageously be inserted concealingly within an upper recess of the box-like body.

The device may advantageously comprise a locking mechanism with key-lock, which interferes with at least one of said mechanical coupling means and counter-means in order to prevent reciprocal disengagement.

In particular, the locking mechanism may comprise a lock cylinder moving an arm so as to interfere with the angular travel path of the at least one tooth.

The power supply battery may advantageously comprise a battery pack interconnected with a corresponding BMS circuit board for regulating and controlling recharging; the battery pack and said BMS circuit board are preferably both enclosed in the box-like body.

The support portion may advantageously enclose inside it a main control board, separate from the aforementioned BMS circuit board and comprising an inverter for driving the electric motor of the electric bicycle.

The aforementioned technical problem is also solved by an electric bicycle, preferably of the pedal-assist type, comprising at least one removable battery holder of the type described above.

These and other characteristic features of the present invention will become clear from the following description provided by way of a non-limiting example with reference to the accompanying drawings in which:

BRIEF DESCRIPTION OF THE DRAWINGS

FIG. 7 shows a perspective view, from above, of the assembly step shown in FIG. 6;

FIG. 8 shows a view, on larger scale, of a detail of FIG. 7;

DETAILED DESCRIPTION

Although below the embodiment of the present invention shown in the illustrations will be described, it is pointed out that the present invention is not limited to said particular embodiment; the object and the scope of the present invention are defined by the accompanying claims.

Figure 1:
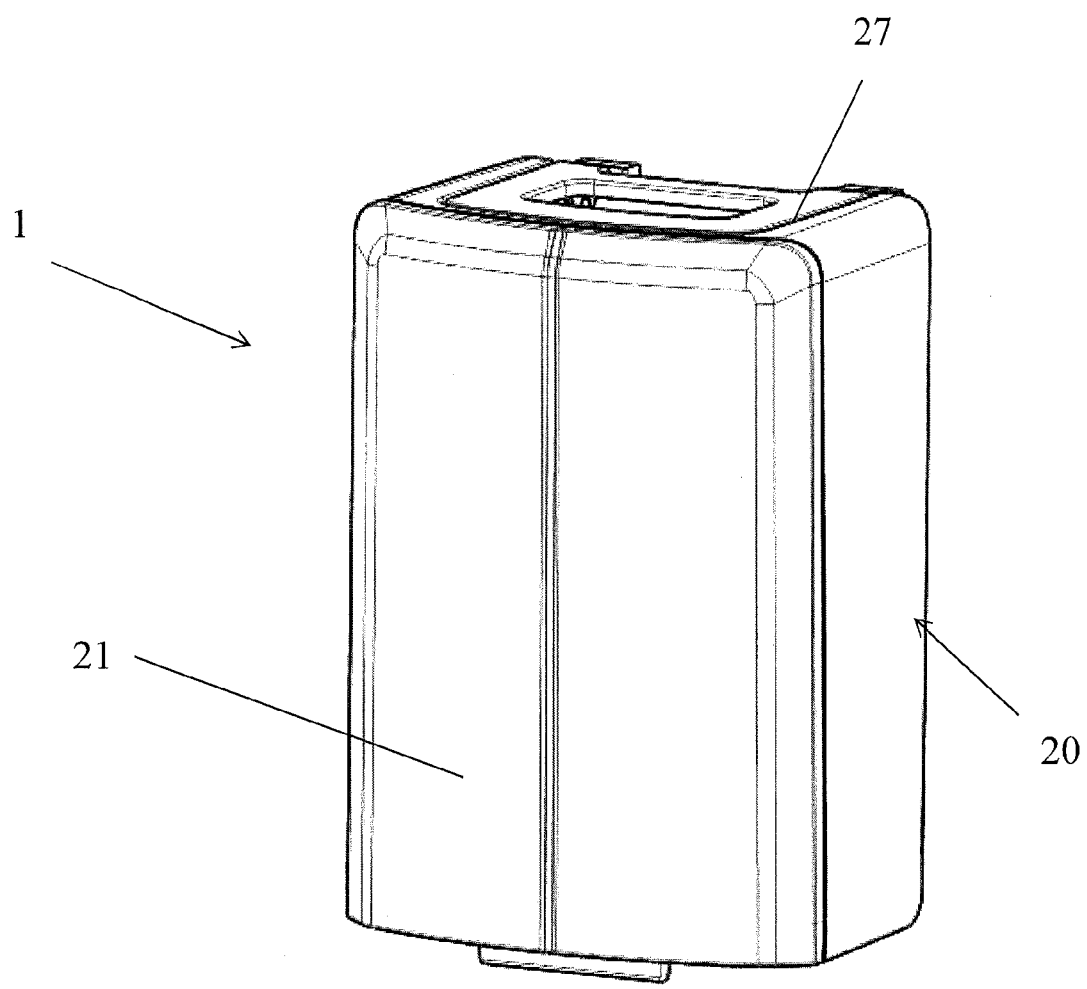
FIG. 1 shows a perspective view of a battery holder device provided in accordance with the present invention.
Figure 2:
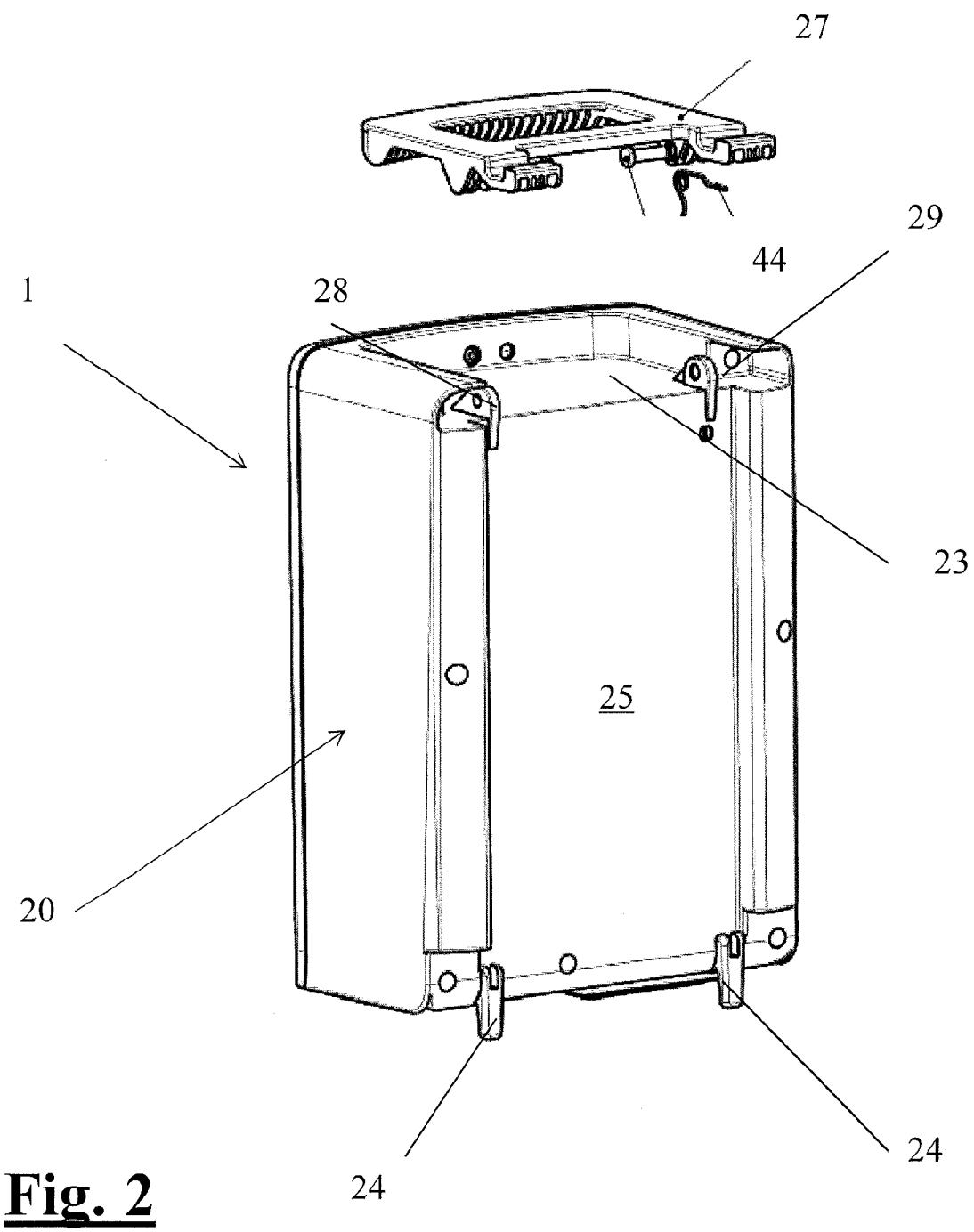
FIG. 2 shows a rear and exploded perspective view of the battery holder device according to FIG. 1.
Figure 3:
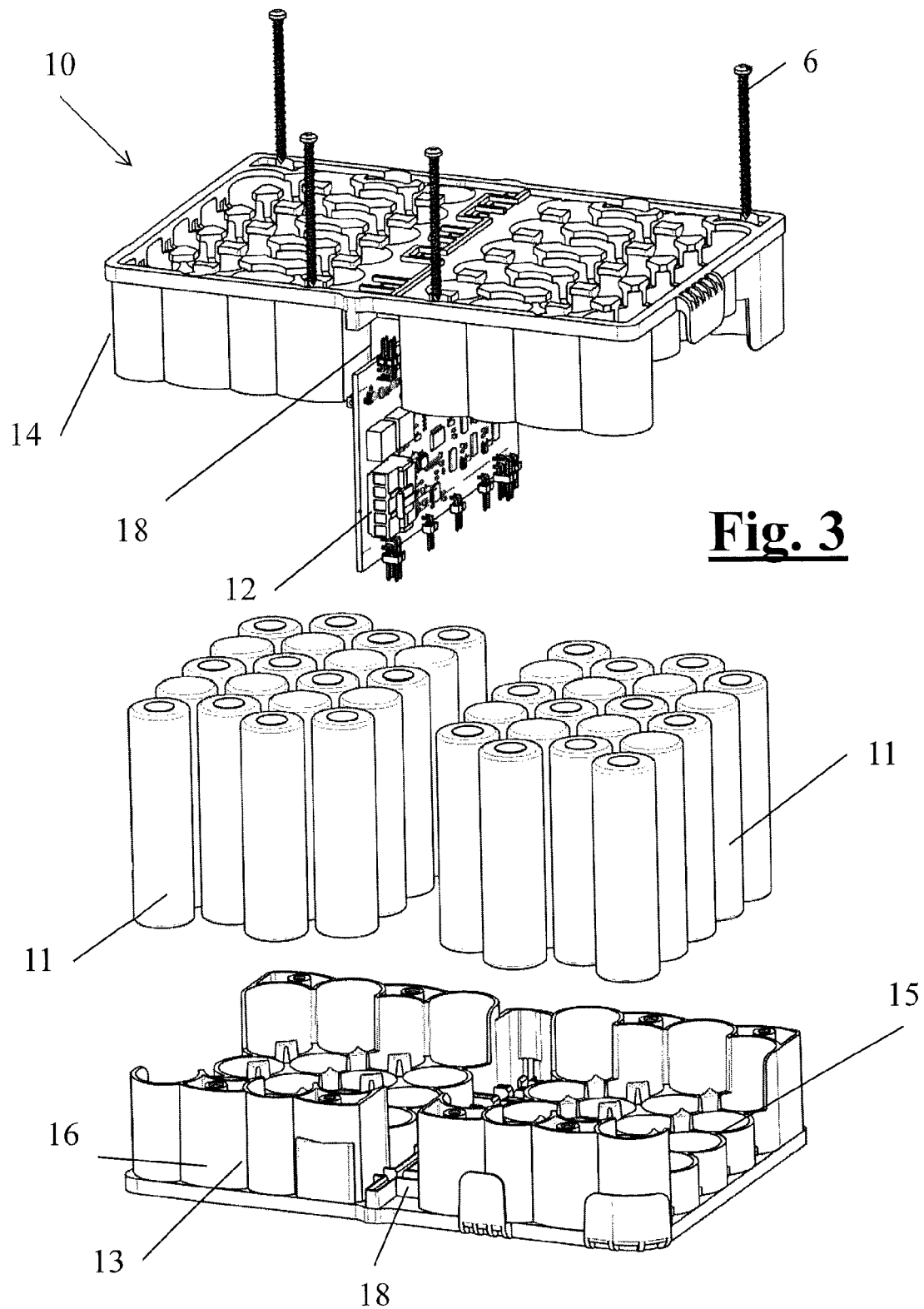
FIG. 3 shows a perspective view, with parts separated, of a battery pack contained inside the battery holder according to FIG. 1.
Figure 11:
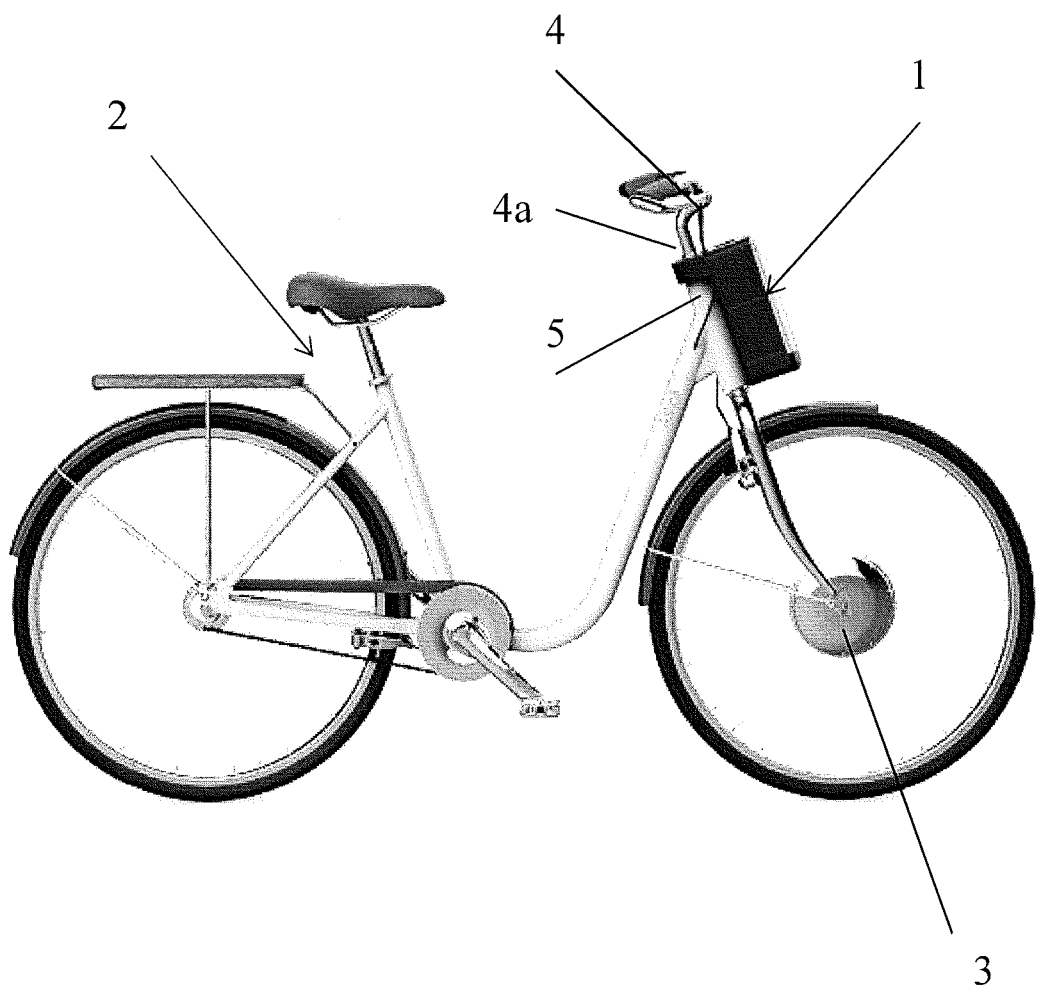
FIG. 11 shows a side view of an electric bicycle equipped with a battery holder device according to the invention.
Figure 12:
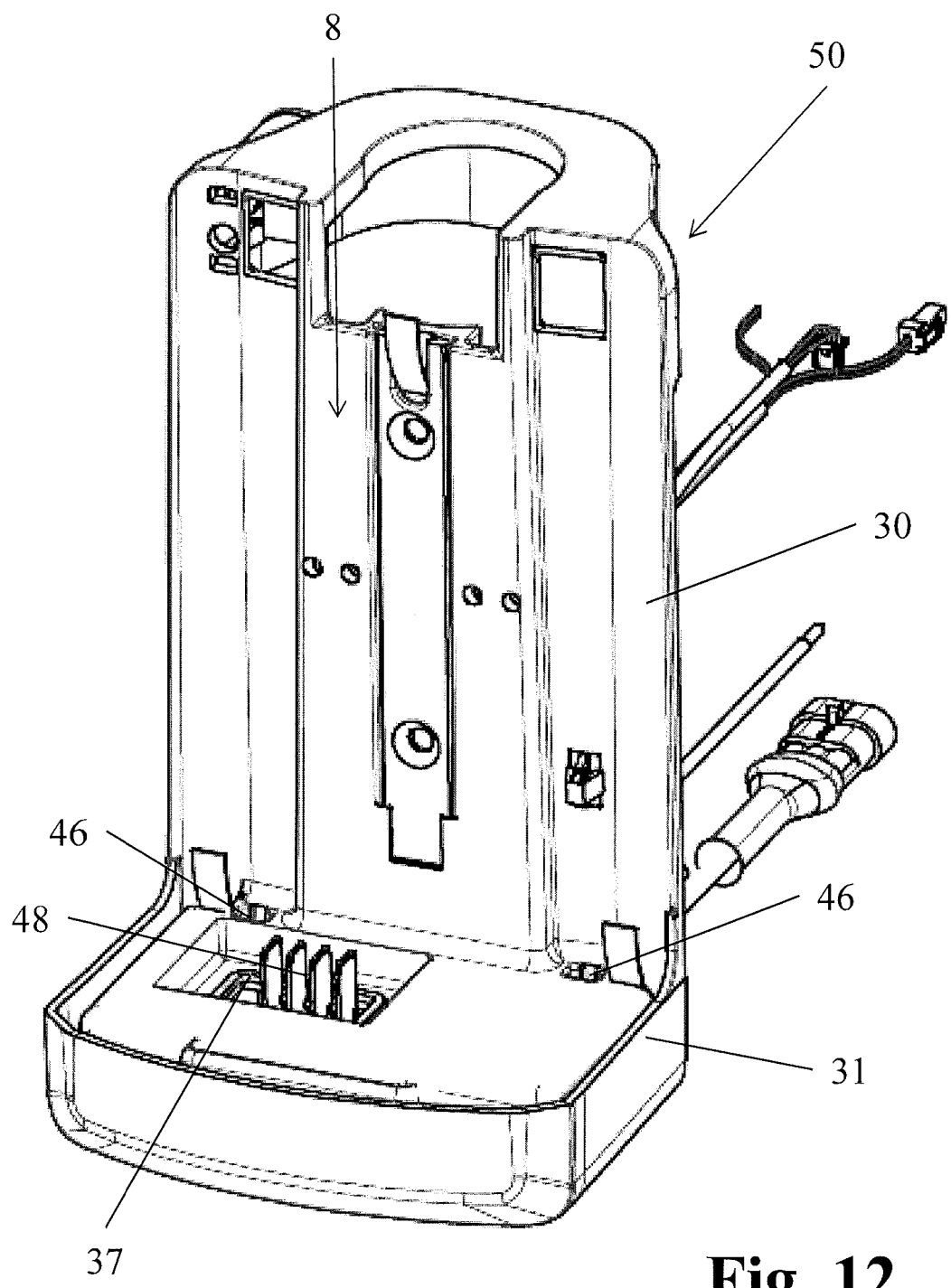
FIGS. 12 and 13 show perspective views of a support portion of the battery holder device according to the present invention.
Figure 13:
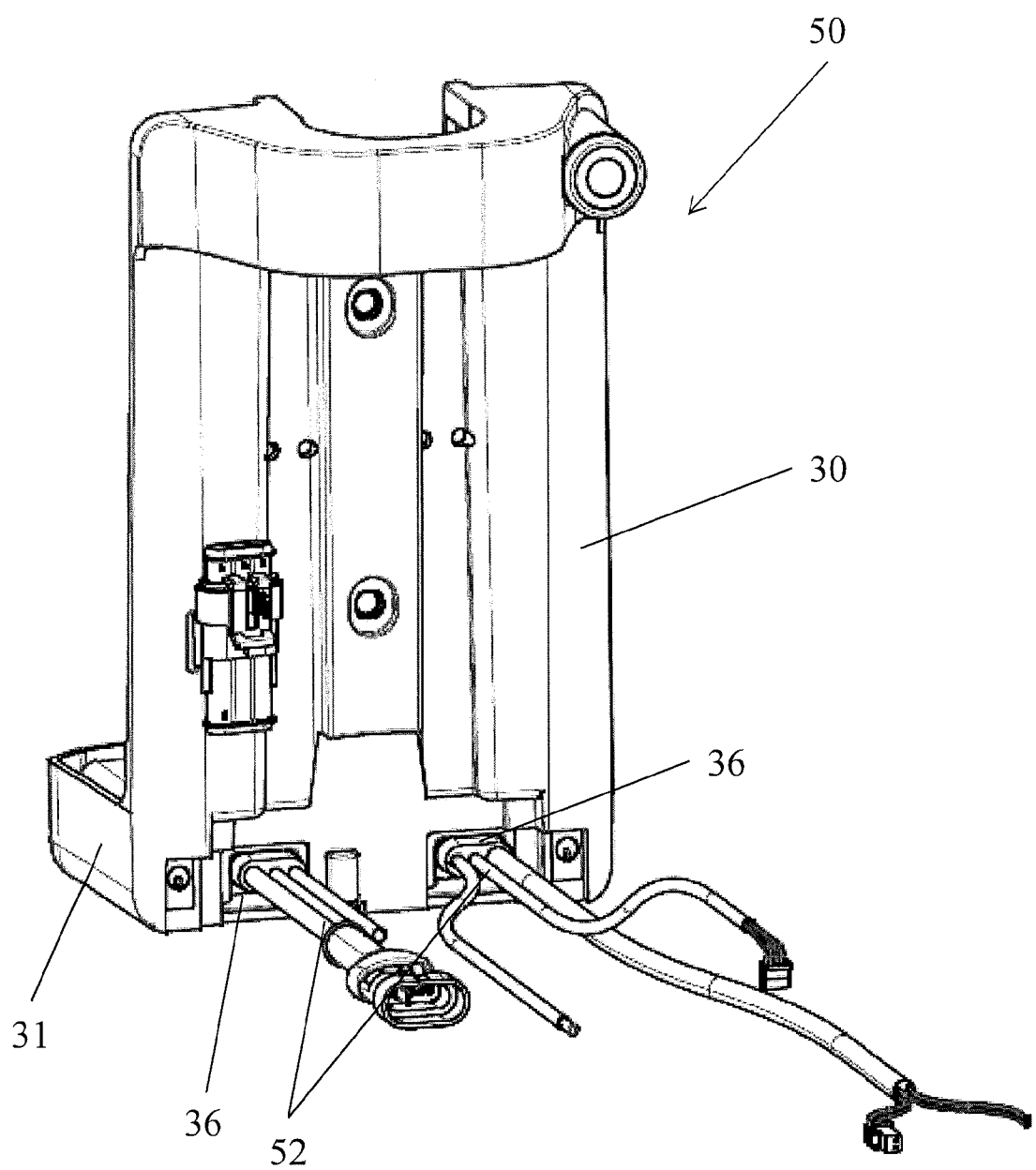
Figure 14:
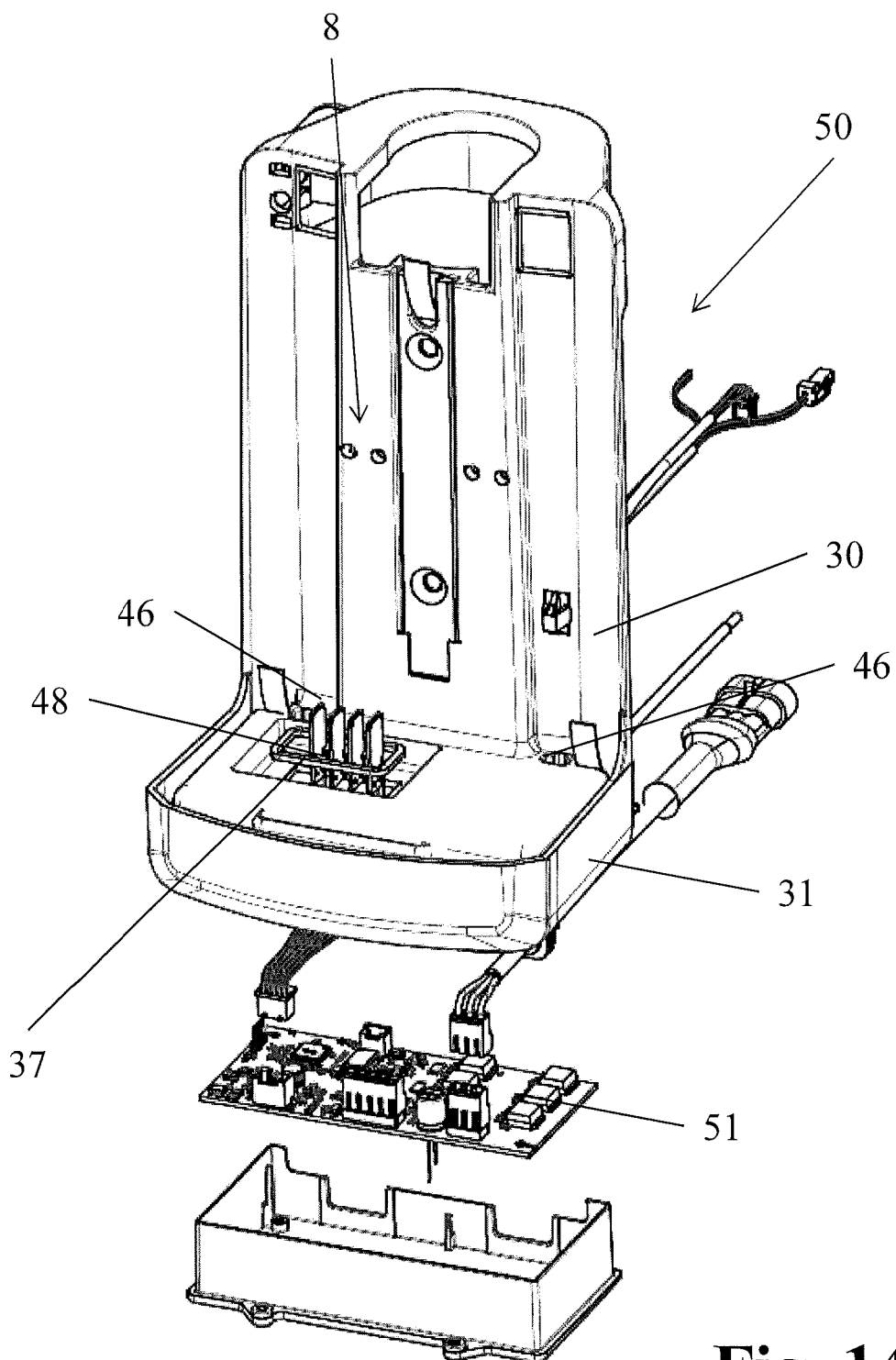
FIGS. 14 and 15 show perspective exploded views of the support portion of the battery holder device according to the present invention.
Figure 15:
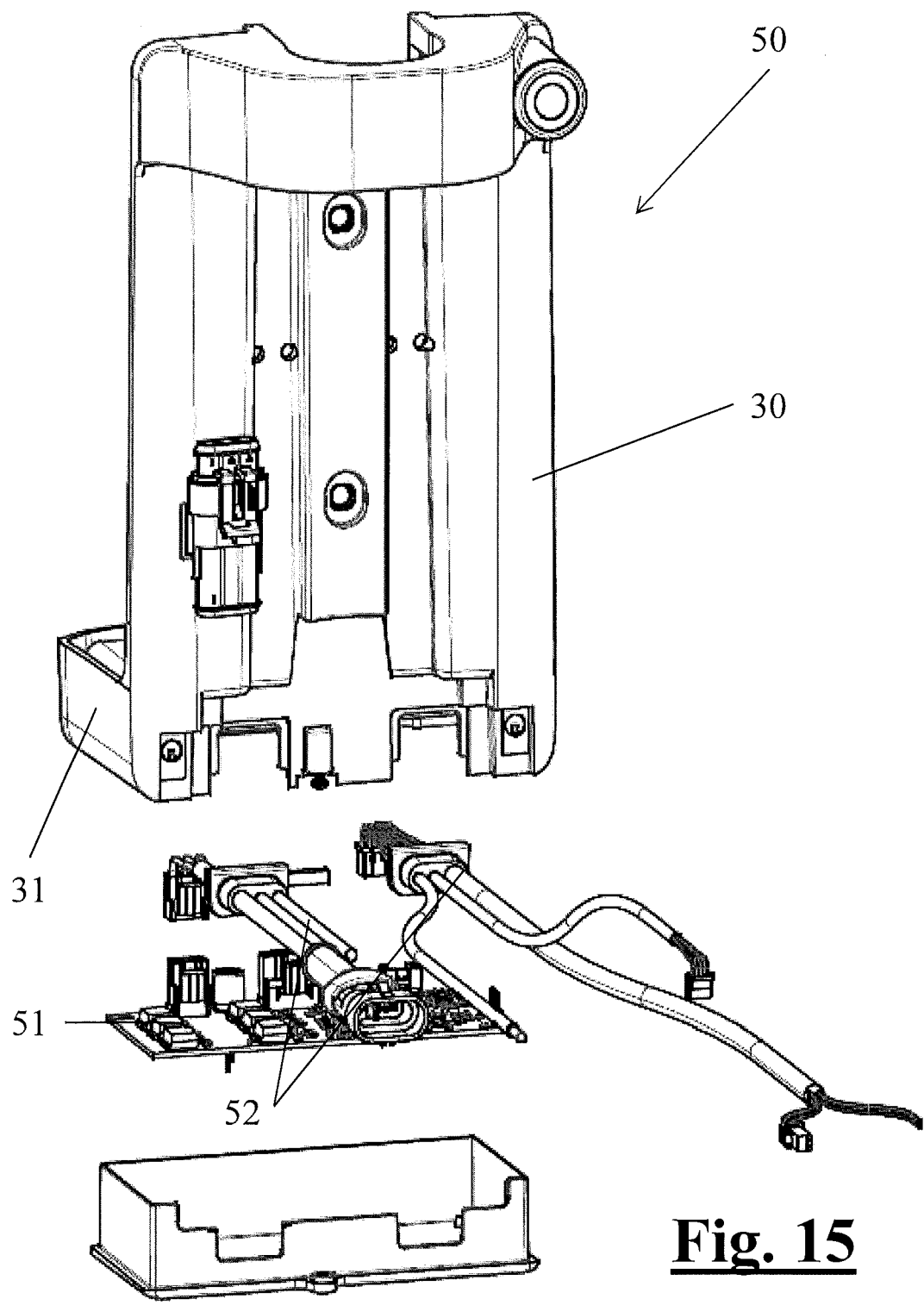

With reference to FIGS. 1 to 3, 1 denotes overall a battery holder device provided in accordance with the present invention. The battery holder device 1 is intended for an electric bicycle, for example of the type with pedal assist by means of an electric motor. FIG. 11 shows an electric bicycle 2 equipped with a synchronous electric motor 3 inserted inside the hub of the front wheel. However, it is quite possible for the battery holder device of the present invention to be associated with a different type of electric bicycle, without this representing any limitation of the Applicant's rights.

In any case, the battery holder device 1 comprises a support portion 50 associated with and fastened to the frame of the bicycle and also connected to the electric motor 3.

The battery holder device 1 comprises a rigid bag having the structure of a box-like body 20 and a gripping handle 27 mounted rotatably so that it may be concealed.

The rigid bag, or the box-like body 20, is removably housed inside a corresponding housing seat 8 formed in the aforementioned support portion 50 which comprises a cantilever 31 supported projecting on the front part of the electric bicycle and a support bracket 30 fastened to the head tube of the bicycle for supporting in a projecting manner the cantilever 31.

Figure 5:
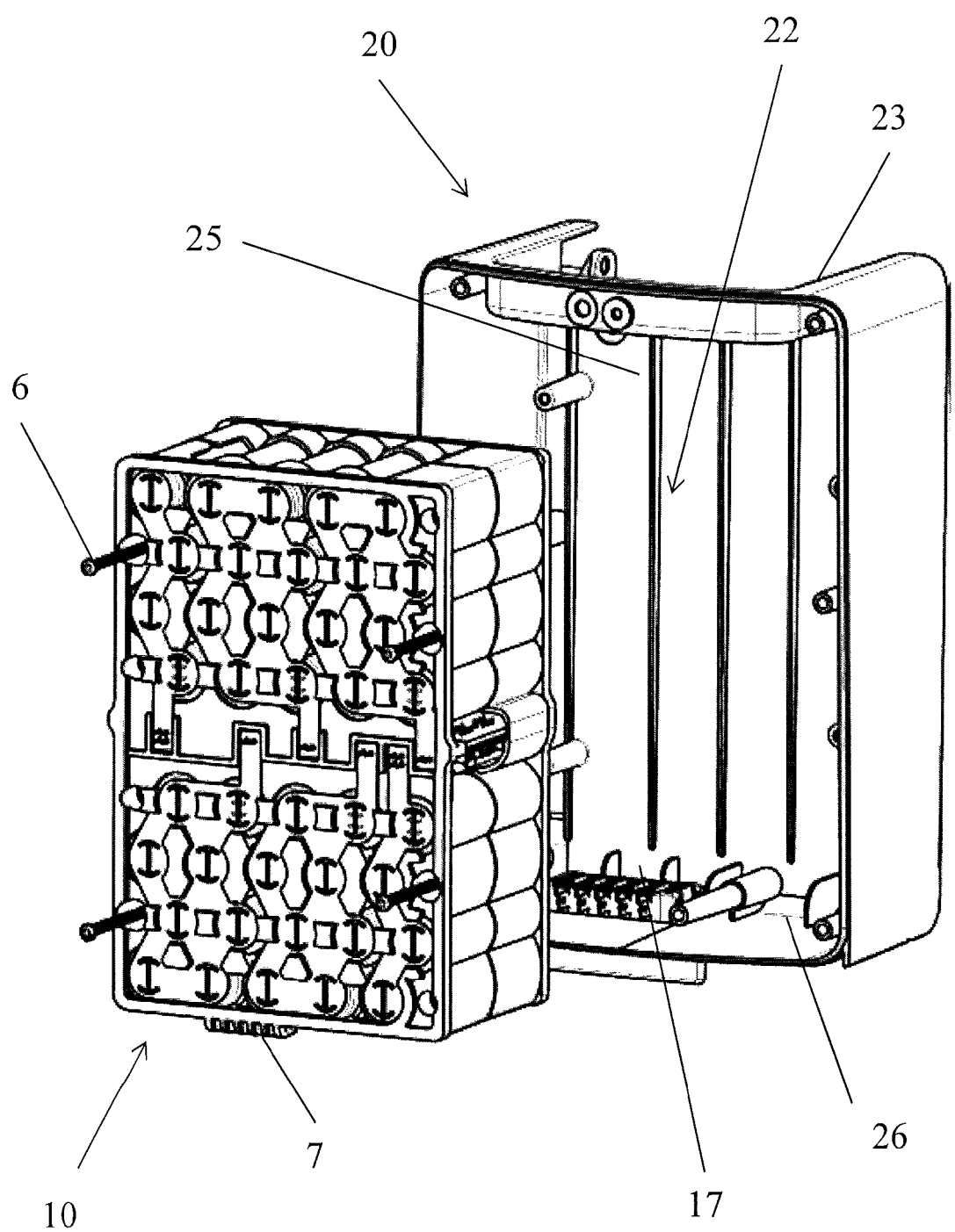
FIG. 5 shows a perspective view of an internal compartment of the battery holder device according to FIG. 1 in the position for receiving the battery pack according to FIG. 3.

As can be seen in FIG. 5, said box-like body 20 comprises substantially an internal compartment 22 for housing a battery pack 10. which is delimited by side walls and by a back wall 25, and a cover 21 for sealingly closing said compartment 22. In particular, said box-like body 20 has a parallelepiped shape with rounded corners and the handle 27 is associated with one of the shorter sides of the box-like body.

In the present embodiment provided by way of a non-limiting example, the compartment 22 has, in the top part with respect to the position mounted on the head tube, a recess 23 suitable for receiving the handle 27 in a concealed manner. As can be seen in FIG. 2, two eyelets 28, 29 are provided on opposite sides of the recess 23 and are intended to receive hinging pins of the handle 27. In particular, said eyelets are arranged on the rear edge, namely on the corner edge aligned of the back wall 25. The handle is thus hinged about an axis substantially corresponding to the rear top edge of the box-like body 20.

One or two elastic springs 44, in particular torsion springs, mounted in the vicinity of one or both the aforementioned hinging pins, ensure correct pre-tensioning of the handle 27 so that it may return into the rest position where it lies concealed inside the recess 23. When gripped, the handle 27 pivots about the hinging pins and allows disengagement of the box-like body 20 from the housing seat 8, as will become clear from the continuation of the description.

The wall opposite to the recess 23 of the box-like body 20 is a support base 26 provided with projecting positioning lugs 24 for facilitating correct positioning of said box-like body 20 on the cantilever 31. Both the eyelets 28, 29 and the positioning lugs 24 are situated in the vicinity of the back wall 25 of the box-like body 20 opposite to the cover 21.

It should be noted that said body 20 is provided in the base wall 26 with a quick-engaging electrical contact connector 17 intended to form an electrical connection with the circuit part contained in the support portion 50, which will be described below.

The connector 17 emerges inside the compartment 22 through a window which is formed in the base wall 26 of the body 20 and which corresponds to an opening 37 formed in the housing seat 8 through which an electric connector 48 of the support portion 50 emerges.

The compartment 22 of the body 20 houses a battery pack 10, the structure of which will be described in detail in the continuation of the present description.

The cover 21 made of a fireproof and plastic-synthetic material identical to that of the compartment 22 has the function of hermetically closing and covering the compartment 22. In particular, along the entire joining profile between the cover 21 and the compartment 22 there is a sealing gasket which is able to provide a type IPX4 class of protection.

The support portion 50, which defines the housing seat 8 of the body 20, is structured essentially with an L shape having a projecting cantilever 31 supported by the bracket 30; the latter is mounted in the vicinity of the handlebars 4 of the bicycle 2, in particular the head tube 4a.

The cantilever 31 has, formed in its top surface, the opening 37 which allows the aforementioned connector 48 for connection with the battery pack 10 to pass through. This connector 48 is directly connected on top of a main control board 51 which is housed inside the body of the cantilever 31. The main control board 51 comprises in particular the power circuitry necessary for controlling the synchronous electric motor mounted inside the motor-driven hub of the bicycle, comprising in the case in question at least one inverter. The main control board 51 has, extending from it, two cable bundles 52 which emerge at the rear from a corresponding number of rear openings 36 of the cantilever 31—namely are arranged on the side for fastening to the head tube 4a.

The cable bundles 52, which are designed to connect the main control board 51 to the motor, to the user interface mounted on the handlebars, and to the auxiliary electrical devices such as the bicycle lights, are concealingly inserted in the frame of the bicycle and emerge in the region of the head tube 4a.

The support bracket 30 comprises a box-like collar 33 which is integrally formed with the bracket 30 and which surrounds the head tube 4a, resting on the top part 5 of the front frame of the bicycle 2 in the zone where the cable bundles 52 emerge.

Said collar 33 has a curved form suitable for allowing the head tube 4a of the bicycle 2 to pass through so that the entire battery holder device 1 may be fastened to the frame of the bicycle 2.

The bracket 30 has two through-openings 38, 39 at its top end, namely at the point where it is joined to the aforementioned collar 33. These rectangular-shaped openings 38, 39 form respective female seats for rapid engagement of corresponding hooks 34, 35 which are formed as one piece in the handle 27 projecting outwards with respect to the hinging pins. The hooks 34, 35 and the respective openings 38, 39 form quick-action coupling means and counter-means for removably fastening the rigid battery-holder bag 1 to the corresponding housing seat 8.

It can be noted in particular that the hooks 34, 35 snap-engage inside the respective openings 38, 39 owing to the thrusting action of the torsion spring 44 which, recalling the handle 27 inside the recess 23, moves the two hooks 34, 35 upwards engaging them inside the said openings 38, 39. It can also be noted how a user, by gripping the handle 27, raises it easily against the action of the torsion spring 44, making use of the lever effect due to the extension of the handle 27 itself. The raising action of the handle 27 simultaneously disengages the two hooks 34, 35, allowing raising of the box-like body 20.

Also envisaged is a mechanical security locking system with key-lock 40 which can be rotated and extracted for locking the rigid battery holder bag 1 inside the corresponding housing seat 8. The key 40 acts on a cylinder lock mechanism 41 which moves an arm 42 which interferes with at least one of the quick-action coupling means, indicated by 32, for relative engagement of a hook 34 on the right-hand side of the battery-holder device 1 and the corresponding seat 39. In particular, the arm 42 is arranged immediately below the hook 34, preventing rotation downwards and at the same time raising of the handle 27 integral therewith.

Figure 4:
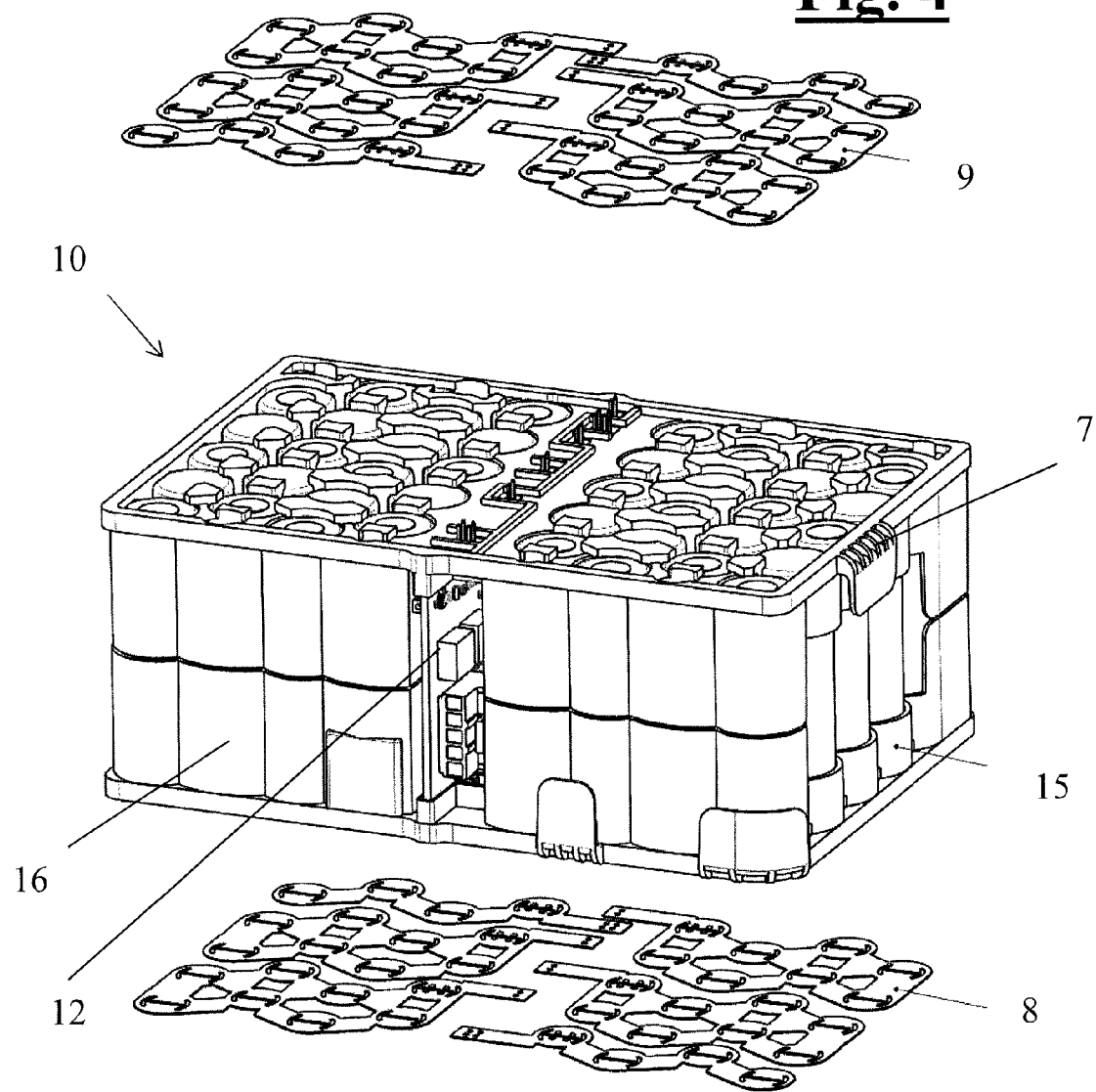
FIG. 4 shows a perspective view of the battery pack according to FIG. 3 in the assembled condition.

With particular reference to the example shown in FIGS. 3, 4 and 5 the structure of a battery pack 10 which equips the battery holder device 1 for storage of the electrical energy necessary for powering the electric motor 3 of the bicycle is now described in detail.

The battery pack 10 comprises a plurality of cells 11, preferably but not necessarily of the lithium ion type, structured as individually rechargeable cylindrical batteries. These batteries are regularly packed together in alternately staggered rows so that they are retained between two half-shells 13, 14 of matching shape. The two half-shells have cylindrical cavity seats 15, each intended to receive a corresponding cell, as well as perimetral lateral-containing shoulders 16 which fit together when the two half-shells are mounted on each other.

In the example of embodiment described here by way of a non-limiting example, at least forty batteries 11 are used, being grouped together in two identical packs of twenty batteries separated by an interstice 18. The cells 11 are interconnected with each other and with a circuit board 12 for regulating and controlling recharging thereof, as described hereinbelow.

As can be seen from FIGS. 3 and 4, the BMS (Battery Management System) circuit board 12 is suitably inserted inside the dividing interstice 18 formed by joining together of the bottom shell 13 and a top shell 14, A detailed description of the structure of the board 12 is not necessary for the purposes of the present invention, it being sufficient to say merely that it contains electronic components and a suitable software which allows regulation of the electric power supply and recharging by the batteries 11 so that both the supplying of power and recharging are performed with a view to optimizing the stored charge and prolonging the working life of the said batteries.

The battery pack 10 also comprises two oppositely arranged metal foils 8, 9 which are preferably obtained by means of pressing from a single conductive metal, such as copper or aluminium, so that all the respective poles of each of said cells 11 may be electrically connected.

During assembly of said battery pack 10, the plurality of cells 11, which are divided up into two groups of twenty cells, are arranged parallel to each other so as to be housed in a corresponding cavity seat 15. The BMS electronic board 12 is arranged between the two groups of cells and also fixed between the adjacently arranged bottom shell 13 and top shell 14. Conventional fixing screws 6 are provided for fixing together the two half-shells 13, 14 of the battery pack 10. Finally, once fixing has been performed, said metal foils 8, 9 are welded on opposite sides and by means of electric welding to the poles of said cells 11. Conventional cables, not shown in the figures, are internally provided for the electrical connections between the metal foils 8, 9 and the board 12. A connector 7 is provided on one side of the battery pack 10 for fixing the ends of the cables inside the battery pack 10, allowing it to be connected to the connector 17 which can be accessed from the outside of the box-like body 20.

At this point the battery pack 10 is ready to be inserted inside the box-like body 20, as clearly shown in FIG. 5. The assembly procedure envisages the insertion of said battery pack 10 inside the compartment 22 of the body 20 and the subsequent closing and hermetic sealing of said compartment 22 with the cover 21. Once the structure of the rigid-bag box-like body 20 has been completed, the handle 27 is fixed inside the recess 23 by means of insertion of the two fixing pins inside the respective eyelets 28, 29. Assembly of the battery pack 10 inside the compartment 22 of the box-like body 20 also allows the connectors 7 and 17 to be joined together and an electrical contact thus established for the external connection of the box-like body 20 to the main control board 51 contained in the support portion 50.

The procedure for positioning the box-like body 20 on the corresponding housing seat 8 provided on the support portion 50, with subsequent locking therein, will now be described.

Figure 6:
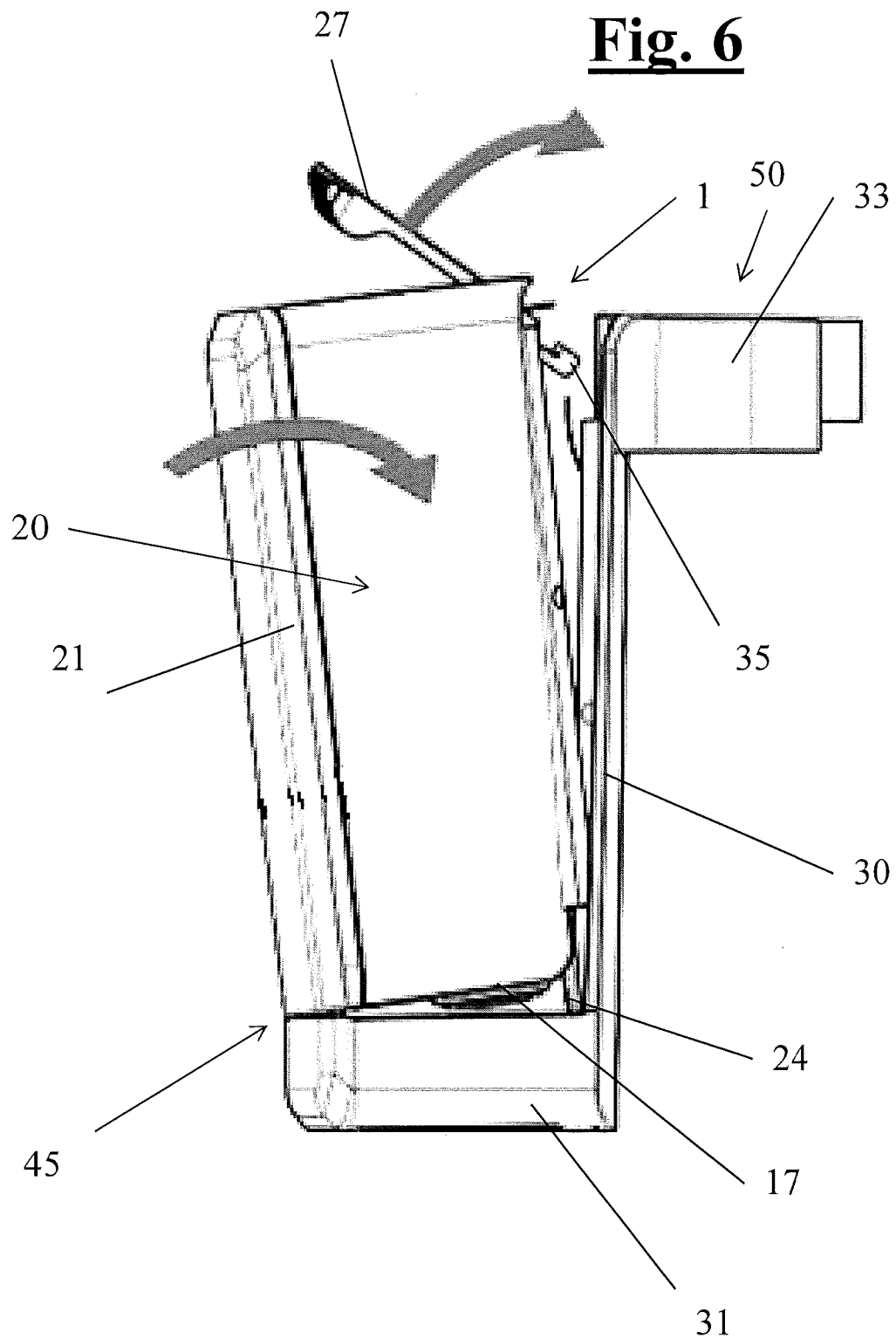
FIG. 6 shows a side view of the battery holder device according to the present invention during assembly in a corresponding housing seat.
Figure 9:
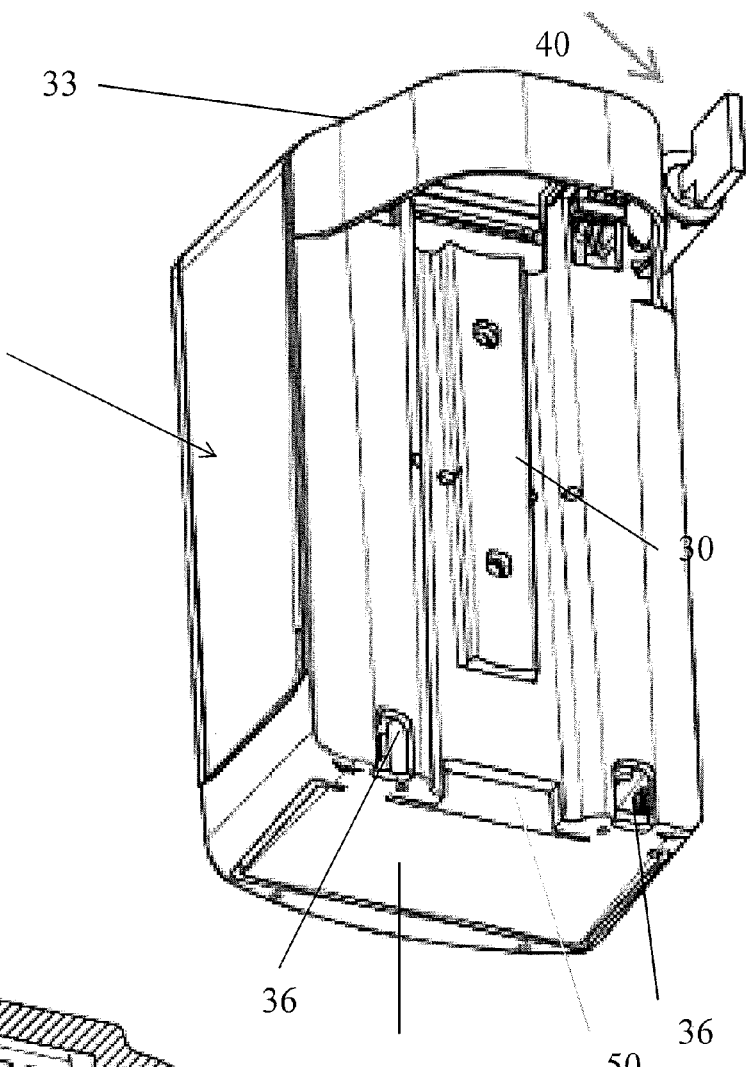
FIG. 9 shows a rear perspective view of the battery holder device according to FIG. 1.
Figure 10:
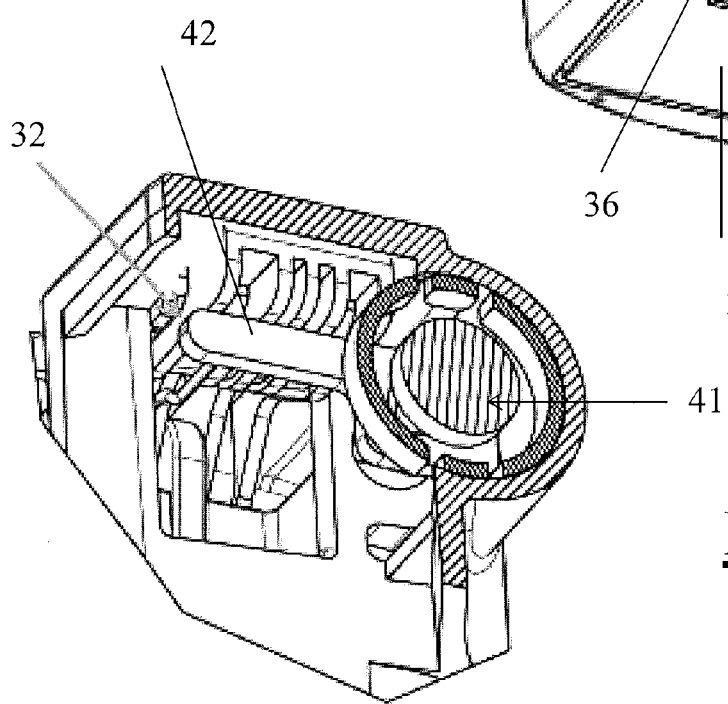
FIG. 10 shows a partially cross-sectioned detail of the view according to FIG. 9.

As is shown in FIG. 6, the support base 26 of the box-like body 20 is initially inclined and placed in contact with the free end 45 of the cantilever 31. Then, the handle 27 is gripped and a rotational movement of the box-like body 20 is performed in the direction of the support bracket 30, pivoting the body on said free end 45. In this way, the base wall 26 of the box-like body 20 is fully fitted inside said housing seat 8 and the support bracket 30 with the pins 24 inserted inside corresponding seats 46 provided at the joining point between the cantilever 31 and the bracket 30.

At the same time, the electrical connector 17 positioned on the base wall 26 of the box-like body 20 is brought opposite the electrical connector 48 of the support portion 51, sliding until it reaches the electrically engaged position.

The aforementioned operation also allows the quick-action coupling means of the handle 27, i.e. the hooks 34 and 35, to be inserted inside the respective openings 38, 39 and the rigid battery holder bag 1 to be fastened inside the respective housing seat 8 upon simple release of the handle.

In fact, as described above the elastic recall means consisting of the torsion spring 44 bring the handle 27 back into the rest condition and allow the coupling means and counter-means 32 to engage with each other, stabling locking the entire box-like body 20 inside the housing seat 8.

Thus assembled, the box-like body 20 has the handle 27 fastened to the top portion of the bracket 30 owing to the engagement between the quick-action coupling means and counter-means 32. Moreover, by rotating the key 40 clockwise through 90°, the arm 42 is positioned so as to interfere with the release of the hook 34 engaged inside the corresponding seat 39. In this way, a further mechanical safety action is ensured during fixing of the rigid battery holder bag inside the corresponding housing seat 8.

In order to remove said box-like body 20 from the housing seat 8 formed on the cantilever 31 and on the support bracket 30, it will be sufficient to raise the handle 27 in order to disconnect the means and counter-means 32 of the quick-action coupling 35, pivoting it on the free end part 45 of the cantilever 31.

The invention achieves numerous advantages, the first of which consisting in the fact that the box-like body 20 comprising inside it the batteries 11 may be removed and is therefore portable, thus allowing the batteries to be recharged also in a location different from the location where the bicycle is kept.

This represents an advantage also from the point of view of safety since the battery holder constitutes a costly item of a pedal-assist electric bicycle.

It should also be mentioned that, with the battery holder positioned on the front of the bicycle, the weight and consequent load distribution are improved. The easy removal of the battery holder and easy recharging of the batteries makes the device extremely convenient for the user. Even assembly of the system during manufacture is greatly speeded up and simplified.

The invention claimed is:

1. A battery holder device for electric bicycle, designed to be associated with a frame and to be electrically connected at least to an electric motor of the electric bicycle, comprising:
   a support portion rigidly associatable with said frame; and
   a box-like body enclosing inside it at least a power supply battery and coupled to a housing seat of said support portion;
   wherein said box-like body is removably coupled to said housing seat and provided with a handle movable between a rest position and an operative position;
   wherein the coupling to said housing seat is performed by snap-engagement of mechanical coupling means and counter-means respectively born by said box-like body and by said support portion, said mechanical coupling means being integral with said handle so that the displacement of said handle from said rest position to said operative position causes disengagement of the mechanical coupling means from the mechanical coupling counter-means;
   wherein said box-like body and said support portion are provided with respective electric connectors which define a reciprocal electrical connection when said box-like body is coupled to said housing seat.

2. The device according to claim 1, wherein said handle is hinged on said box-like body about a hinging axis; said mechanical coupling means comprising at least one tooth formed on an extension arm of the handle extending beyond the hinging axis.

3. The device according to claim 2, wherein said mechanical coupling counter-means comprise at least an opening formed on said housing seat, said at least one tooth integral with said handle engaging in said opening when the handle is in the rest position.

4. The device according to claim 2, wherein said handle is constantly biased towards the rest position by elastic recall means.

5. The device according to claim 4, wherein said handle, in its rest position, is inserted concealingly within an upper recess of the box-like body.

6. The device according to claim 1, wherein a locking mechanism with key-lock is provided, said key-lock interfering with at least one of said mechanical coupling means and counter-means in order to prevent reciprocal disengagement.

7. The device according to claim 2, wherein a locking mechanism with key-lock is provided, which interferes with at least one of said mechanical coupling means and counter-means in order to prevent reciprocal disengagement, wherein said locking mechanism comprises a lock cylinder moving an arm so as to interfere with an angular travel path of the at least one tooth.

8. The device according to claim 1, wherein said power supply battery comprises a battery pack interconnected with a corresponding BMS circuit board for regulating and controlling recharging, said battery pack and said BMS circuit board being both enclosed in the box-like body.

9. The device according to claim 1, wherein said support portion encloses inside it a main control board comprising an inverter for driving the electric motor of the electric bicycle.

10. An electric bicycle comprising at least a removable battery holder device according to claim 1.

* * * * *